ated Feb. 9, 1971

3,562,293
2-PHENYL-3-(3-PYRROLIN-1-YL)-PROPIOPHENONES

Robert Bruce Moffett, Kalamazoo, Mich., assignor to The Upjohn Company, Kalamazoo, Mich., a corporation of Delaware
No Drawing. Filed July 25, 1968, Ser. No. 747,483
Int. Cl. C07d 27/14
U.S. Cl. 260—326.5                    3 Claims

ABSTRACT OF THE DISCLOSURE

This invention relates to novel 2-phenyl-3-(3-pyrrolin-1-yl)-propiophenones; it is inclusive of the free base and acid addition salt forms of the compounds embraced by the formula

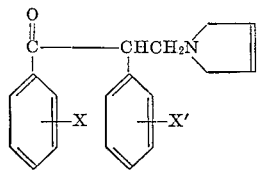

I wherein X and X' are selected from the group consisting of hydrogen, lower-alkyl, fluorine, chlorine and bromine.

As used in this specification, the term "lower-alkyl" means alkyl of from one through four carbon atoms, e.g., methyl, ethyl, propyl, butyl and the isomeric forms thereof.

CROSS REFERENCE TO RELATED APPLICATIONS

Ser. No. 747,428 filed of even date covering novel 2-phenyl-3-tertiaryamino-1-(2-thienyl)-1-propanones.

Ser. No. 747,450 filed of even date covering 2-phenyl-3-(3-azabicyclo[3.2.2]nonan-3-yl)-propiophenones and 2-phenyl-3-(2 - azabicyclo[2.2.2]octan-2-yl) - propiophenones.

Ser. No. 747,482 filed of even date covering 2-phenyl-3-(1-azaspiro[4.5]dec-1-yl)-propiophenones.

Ser. No. 747,426 filed of even date covering 2-phenyl-3-(3-quinuclidinylamino)-propiophenones.

Ser. No. 747,425 filed of even date covering 2-phenyl-3-(4-hydroxy - 4 - phenylpiperidino)-propiophenones.

BRIEF SUMMARY OF THE INVENTION

The novel compounds embraced by Formula I exist either in the non-protonated (free base) form or in the protonated (acid addition salt) form, depending on the pH of the environment. They form stable protonates, i.e., acid addition salts, on neutralization of the free base with suitable acids, for example, hydrochloric, hydrobromic, sulfuric, phosphoric, nitric, acetic, benzoic, salicylic, glycollic, succinic, nicotinic, tartaric, maleic, malic, pamoic, methanesulfonic, cyclohexanesulfanic, picric and lactic acids, and the like.

The novel 2-phenyl-3-(3-pyrrolin-1-yl)-propiophenones of Formula I are prepared by mixing a corresponding 2-phenylacrylophenone of the formula

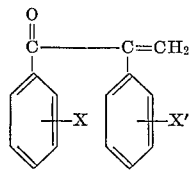

II wherein X and X' have the same meaning as above, with 3-pyrroline of the formula

III 2-phenylacrylophenones (II) are known in the art and can be prepared in the manner described in Bull. Soc. Chim. France 1176 (1963).

3-pyrroline (III) can be prepared in accordance with the procedure set forth in Ber. 16, 1536.

In carrying out the reaction between the acrylophenones (II) and 3-pyrroline (III), the two reactants are merely mixed. Inert solvents such as an alkanol (e.g., methanol or ethanol) can be employed, if desired. Heating of the reaction mixture is not necessary. The molecular ratio of the compounds of Formula II and Formula III can be varied, substantially equimolar ratios having been found satisfactory. The time required for the completion of the reaction depends upon such factors as the particular reactants, their solubility, their relative amounts, thoroughness of mixing, and the like. Therefore, it will be understood that the optimum reaction time will vary for each set of reaction conditions. Ordinarily, reaction times ranging from about several hours to about ten days are suitable. After completion of the reaction between the compounds of Formula II and Formula III, the product (I) is isolated from the reaction mixture in its free base form, using conventional procedures such as filtration, solvent evaporation, solvent extraction, chromatography of crystallization, or a combination of these methods. The free bases so obtained can be purified, e.g., by recrystallization from a solvent or suitable mixture of solvents. The free base form can be converted to any acid addition salt by neutralization with an acid, e.g., any of those given above.

The compounds of Formula I stimulate the central nervous ssytem in mammals and animals, e.g., mice, rats and birds; they antagonize convulsions and prevent death resulting from the administration of nicotine to mice. They also increase food intake and weight gain in mice.

DETAILED DESCRIPTION

It is to be understood that the invention is not to be limited to the exact details of operation or exact compositions shown and described herein, as obvious modifications and equivalents will be apparent to those skilled in the art, and the invention is therefore to be limited only by the scope of the appended claims.

PREPARATION 1

2-phenylacrylophenone (or 1,2-diphenyl-2-propen-1-one) (II)

A solution of 294 g. (1.5 moles) of phenyl benzyl ketone (also known as desoxybenzoin), 360 ml. of 37% formaldehyde, and 7.5 ml. of piperidine in 1.35 l. of methanol in a 5 l. flask is stirred under reflux for about 3 hours and allowed to stand for about 16 hours. The mixture is diluted with 2 l. of water and the resulting oil extracted with 2 l. of ether in 2 portions. The ether solutions are washed successively with 150 ml. of aqueous 5% hydrochloric acid solution, 200 ml. of 5% aqueous sodium bicarbonate solution, 300 ml. of water, saturated aqueous sodium chloride solution, and dried over sodium sulfate. After filtration, the solvent is evaporated and the resulting syrup distilled from a Claisen flask to give 266.6 g. (85% yield) of 2-phenylacrylophenone (II) as a colorless oil having a boiling point of 205 to 207° C. (at 15 mm. of Hg). This material crystallizes and is stable at 0° C.

Following the procedure of Preparation 1, but substituting for phenyl benzyl ketone the following:

(1) phenyl p'-chlorobenzyl ketone,
(2) p-bromophenyl p-bromobenzyl ketone,
(3) m-chlorophenyl m-chlorobenzyl ketone,
(4) p-fluorophenyl benzyl ketone,
(5) p-chlorophenyl p-methylbenzyl ketone,
(6) o-propylphenyl o-bromobenzyl ketone,
(7) o-bromophenyl m-ethylbenzyl ketone,
(8) m-fluorophenyl p-butylbenzyl ketone,
(9) p-methylphenyl p-methylbenzyl ketone,
(10) o-butylphenyl p-butylbenzyl ketone, etc., there can be prepared, respectively, (1) 2-(p-chlorophenyl)acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc.

EXAMPLE 1

2-phenyl-3-(3-pyrrolin-1-yl)-propiophenone (I)

A mixture of 27 g. (0.13 mole) of 2-phenylacrylophenone (II) and 9 g. of 3-pyrroline (III) becomes warm and is slightly cooled. Crystals soon separate and the mixture sets solid. After standing for about 3 days at room temperature, the product is recrystallized from 150 ml. of 2-propanol, giving 30.8 g. (95.5% yield) of nearly white crystals of 2-phenyl-3-(3-pyrrolin - 1 - yl) - propiophenone (I), having a melting point of 99 to 101° C. Infrared and nuclear magnetic resonance (NMR) spectra support the structure proposed for the thus produced compound.

Analysis.—Calcd. for $C_{19}H_{19}NO$ (percent): C, 82.28; H, 6.90; N, 5.05. Found (percent): C, 82.51; H, 7.23; N, 5.25.

Following the procedure of Example 1, but substituting for 2-phenylacrylophenone (II) the following:

(1) 2-(p-chlorophenyl)acrylophenone (II),
(2) 2-(p-bromophenyl)-4'-bromoacrylophenone (II),
(3) 2-(m-chlorophenyl)-3'-chloroacrylophenone (II),
(4) 2-phenyl-4'-fluoroacrylophenone (II),
(5) 2-(p-methylphenyl)-4'-chloroacrylophenone (II),
(6) 2-(o-bromophenyl)-2'-propylacrylophenone (II),
(7) 2-(m-ethylphenyl)-2'-bromoacrylophenone (II),
(8) 2-(p-butylphenyl)-3'-fluoroacrylophenone (II),
(9) 2-(p-methylphenyl)-4'-methylacrylophenone (II),
(10) 2-(p-butylphenyl)-2'-butylacrylophenone (II), etc., there can be prepared, respectively, (1) 2-(p-chlorophenyl)-3-(3-pyrrolin-1-yl)-propiophenone (I),
(2) 2-(p-bromophenyl)-3-(3-pyrrolin-1-yl)-4'-bromopropiophenone (I),
(3) 2-(m-chlorophenyl)-3-(3-pyrrolin-1-yl)-3'-chloropropiophenone (I),
(4) 2-phenyl-3-(3-pyrrolin-1-yl)-4'-fluoropropiophenone (I),
(5) 2-(p-methylphenyl)-3-(3-pyrrolin-1-yl)-4'-chloropropiophenone (I),
(6) 2-(o-bromophenyl)-3-(3-pyrrolin-1-yl)-2'-propyl propiophenone (I),
(7) 2-(m-ethylphenyl)-3-(3-pyrrolin-1-yl)-2'-bromopropiophenone (I),
(8) 2-(p-butylphenyl)-3-(3-pyrrolin-1-yl)-3'-fluoropropiophenone (I),
(9) 2-(p-methylphenyl)-3-(3-pyrrolin-1-yl)-4'-methylpropiophenone (I),
(10) 2-(p-butylphenyl)-3-(3-pyrrolin-1-yl)-2'-butylpropiophenone (I), etc.

EXAMPLE 2

2-phenyl-3-(3-pyrrolin-1-yl)-propiophenone hydrochloride (I)

A solution of 30.5 g. (0.11 mole) of the free base form of 2-phenyl-3-(3-pyrrolin-1-yl)-propiophenone (I) obtained in Example 1 in 150 ml. of 2-propanol is made acidic with 8 N ethanolic hydrogen chloride at the boiling point. On cooling, white crystals separate giving 31.9 g. (93% yield) of 2-phenyl-3-(3-pyrrolin-1-yl)-propiophenone hydrochloride (I), having a melting point of 151 to 154.5° C. (with decomposition).

Analysis.—Calcd. for $C_{19}H_{20}ClNO$ (percent): C, 72.72; H, 6.42; Cl, 11.30; N, 4.46. Found (percent): C, 72.84; H, 6.40; Cl, 11.50; N, 4.49.

On neutralization of the thus obtained hydrochloride (I) with sodium hydroxide or potassium hydroxide, the free base form, 2 - phenyl-3-(3-pyrrolin-1-yl) - propiophenone (I) is produced.

Following the procedure of Example 2, but substituting for hydrogen chloride another acid, e.g., hydrobromic, sulfuric, phosphoric, acetic, benzoic, salicylic, citric, succinic, malic, cyclohexanesulfamic, etc., the corresponding acid addition salt of 2-phenyl-3-(3-pyrrolin-1-yl)-propiophenone (I) can be prepared.

Following the procedure of the immediately preceding paragraph and of Example 2, but substituting for the free base form of 2-phenyl-3-(3-pyrrolin-1-yl)-propiophenone (I) other compounds embraced by Formula I, such as those designated (1) through (10) in the paragraph directly above Example 2, their corresponding acid addition salts can be prepared.

Modes of administration and dosages of the products of Formula I of this invention for use as central nervous system stimulants are analogous to those disclosed in U.S. Pat. 3,203,962.

I claim:
1. A compound selected from the group consisting of (1) a compound of the formula

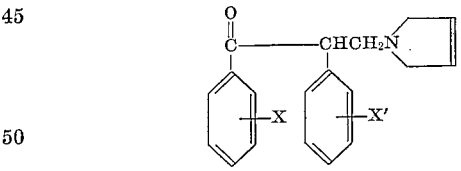

wherein X and X' are selected from the group consisting of hydrogen, lower-alkyl, fluorine, chlorine and bromine, and (2) an acid addition salt thereof.

2. A compound of claim 1 wherein X and X' are hydrogen, namely, 2-phenyl-3-(3-pyrrolin-1 - yl) - propiophenone.

3. An acid addition salt of claim 1 wherein X and X' are hydrogen, and the acid addition salt is that of hydrogen chloride, namely, 2-phenyl-3-(3-pyrrolin-1 - yl)-propiophenone hydrochloride.

References Cited

UNITED STATES PATENTS 3,203,962   8/1965   Huebner _____ 260—326.5

ALEX MAZEL, Primary Examiner

J. A. NARCAVAGE, Assistant Examiner

U.S. Cl. X.R.

260—999